United States Patent [19]
Shank et al.

[11] Patent Number: 6,145,028
[45] Date of Patent: Nov. 7, 2000

[54] ENHANCED MULTI-PATHING TO AN ARRAY OF STORAGE DEVICES

[75] Inventors: Eric M. Shank, San Diego; Brian J. Raccuglia, Murrieta, both of Calif.

[73] Assignee: NCR Corporation, Dayton, Ohio

[21] Appl. No.: 08/988,886

[22] Filed: Dec. 11, 1997

[51] Int. Cl.[7] .................................................. G06F 13/00
[52] U.S. Cl. ............................ 710/31; 710/38; 710/131; 711/6; 711/114; 711/156; 711/162; 714/6; 714/8; 714/11; 714/43; 714/56
[58] Field of Search .................................... 711/156, 203, 711/211, 221, 6, 114, 162; 710/131, 31, 38; 714/6, 8, 11, 43, 56

[56] References Cited

U.S. PATENT DOCUMENTS

| | | | |
|---|---|---|---|
| 4,435,755 | 3/1984 | Meritt ........................................ | 710/38 |
| 5,119,488 | 6/1992 | Takamatsu et al. ..................... | 709/239 |
| 5,345,565 | 9/1994 | Jibbe et al. .............................. | 710/130 |
| 5,388,243 | 2/1995 | Glider et al. ............................. | 710/38 |
| 5,404,487 | 4/1995 | Murata et al. ........................... | 711/113 |
| 5,428,796 | 6/1995 | Iskiyan et al. .......................... | 710/240 |
| 5,937,428 | 8/1999 | Jantz ....................................... | 711/114 |
| 5,940,393 | 8/1999 | Duree et al. ............................ | 370/392 |

OTHER PUBLICATIONS

What is RAID Manager 5 With RDAC?—Introduction to RAID Manager 5 With RDAC, unixrdac.bk: chapt3.doc, RAID Manager 5 With RDAC Release 5 for UNIX V.4 User Guide, Sep. 17, 1996, pp. 3–9–3–30.

*Primary Examiner*—Hiep T. Nguyen
*Attorney, Agent, or Firm*—Gates & Cooper

[57] ABSTRACT

A method, apparatus and article of manufacture for hardware independent system level control of storage units in an array is disclosed. The method comprises the steps of scanning the array of storage devices to find available I/O paths, storing a list of available I/O paths to each storage device in a memory, receiving an I/O request directed at a virtual disk memory location, mapping the virtual disk memory location to a corresponding storage device, selecting an I/O path for the I/O request from the list of available I/O paths in stored in the memory, and transmitting the I/O request to the storage device over the selected I/O path. The apparatus comprises a virtual disk driver functionally coupled between the computer and the disk array with a core driver and a subordinate driver customized for storage device arrays from different hardware vendors. Selection of the subordinate driver is accomplished via a switch table stored in the computer memory.

29 Claims, 7 Drawing Sheets

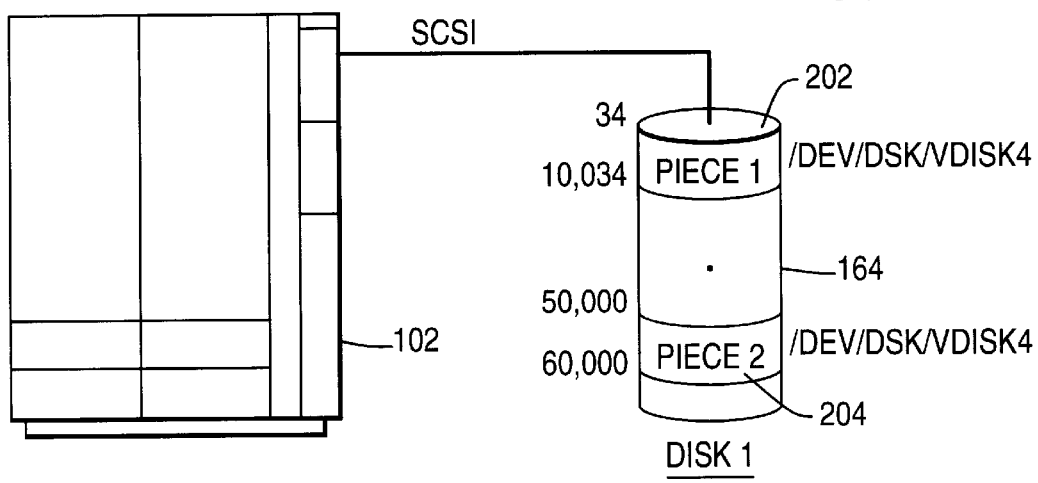
FIG. 2
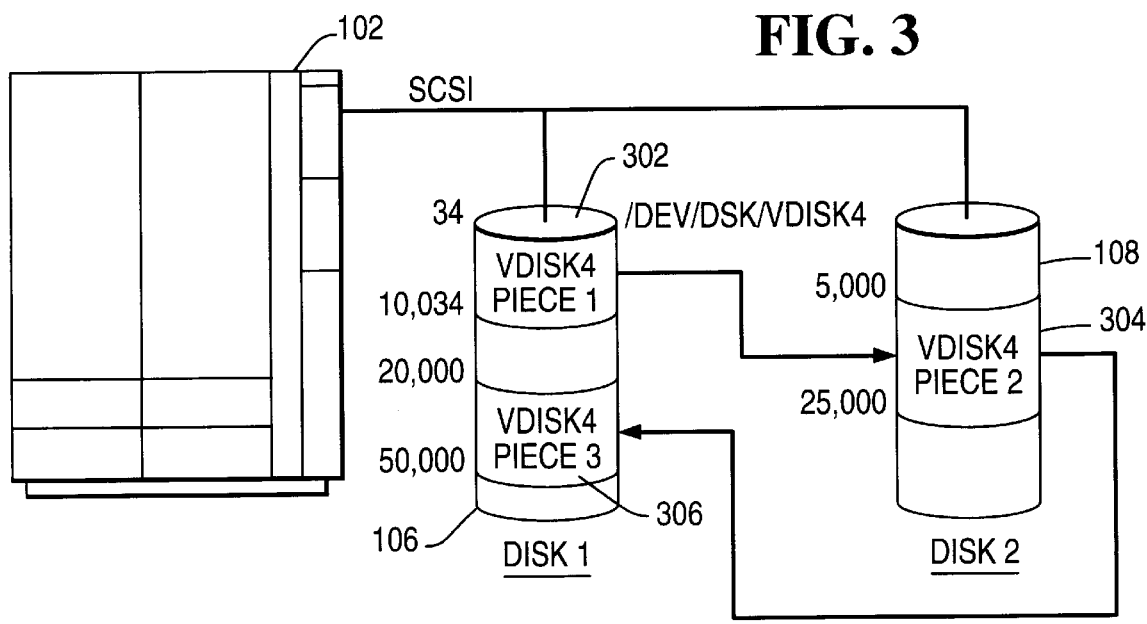
FIG. 3
FIG. 4
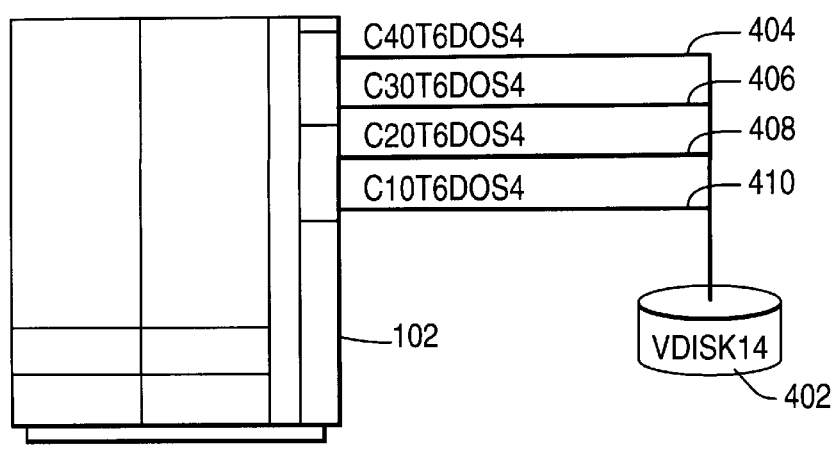

ENHANCED MULTI-PATHING TO AN ARRAY OF STORAGE DEVICES

BACKGROUND OF THE INVENTION

1. Field of Invention

The present invention relates generally to data storage devices and more specifically to a hardware independent system and method for adaptively managing and controlling multi-path access to an array of data storage devices.

2. Description of Related Art

Large-scale integrated database management systems provide an efficient, consistent, and secure means for storing and retrieving vast amounts of data. This ability to manage massive amounts of information has become a virtual necessity in business today. Indeed, in some cases, the data stored in the company's databases may provide the very backbone for the company, as in stock fund trading and reservation systems. In those businesses, and others, the data may assume the status of a business strategic asset.

As businesses begin to rely more heavily on large scale database management systems, the consequences of hardware-related data losses intensify, and the security, reliability, and availability of those systems becomes paramount.

One way to increase the security, reliability and availability of data stored in large databases is to employ a technology known as a redundant array of inexpensive disks, or RAID. RAID is a storage approach that achieves high availability by applying redundancy techniques to the storage of data. These redundancy techniques can also improve input/output (I/O) performance by re-distributing access to storage across the multiple storage devices decreasing queue lengths and improving access time. This process is known as load-balancing.

High data availability is often achieved through redundancy, either by "mirroring" or by the use of "parity" drives. Mirroring involves a one-for-one backup of the data storage devices for each drive, allowing the data to be simply read off of the remaining mirrored drive when the primary drive fails. The parity technique augments the array of storage devices with an additional storage device that contains the parity of the data from corresponding logical locations of the RAID rank (the number of drives that the data and parity will be spread across). If a drive in a RAID rank is lost, the controller reconstructs the lost data from the remaining data and the parity data, preventing the loss of data.

Five RAID "levels" are commonly used. RAID 0 provides increased throughput, but does not increase reliability, since it does not provide for additional redundancy. Large files are striped across multiple drives in chunks (a predetermined multiple of the logical block size) to improve data access and reduce data latency. RAID 1 provides full mirroring of each disk. If one of the disks fail, the mirrored copy takes over until the failed disk is replaced. Performance can be improved, if, in addition to mirroring, reads are spread across the spindles of the mirrored disks as well. In RAID 3, data is stored across multiple drives, and a parity value is generated and stored on a dedicated parity storage device. If one of the primary storage devices fails, the data can be reconstructed from the remaining disks and the parity disk. RAID 5 is similar to RAID 3, except that the parity data is spread across all drives in the array.

While current RAID technology provides increased availability and reliability through control of redundant storage elements in a disk array, it does not take full advantage of system-level redundancies. For example, although a server/disk array combination may include redundant paths to one or more storage devices in the disk array, or paths to other storage arrays, current systems do not permit the global, system-wide monitoring or control of data across these paths. One reason for this deficiency is the inherent difficulty in implementing a systems-level storage solution that is operable with a variety of disk storage array designs and technologies.

SUMMARY OF THE INVENTION

In view of the foregoing, it is apparent that there a need for a method and apparatus that provides hardware-independent system level control of the storage and retrieval of data from one or more arrays of diverse storage devices. The present invention satisfies that need. In accordance with the present invention, a method and apparatus is disclosed which scans the array of storage devices to find all available I/O paths, and stores a list of available I/O paths in a memory. When the apparatus receives an I/O request from an application directed at a virtual disk memory location, the virtual disk memory location is mapped to a corresponding storage device, and an I/O path for the I/O request is selected from the available I/O paths in the memory, and the I/O request is transmitted to the storage device over the selected I/O path.

BRIEF DESCRIPTION OF THE DRAWINGS

Throughout the following, reference numerals will be used in the drawings, and like reference numerals will be used throughout the several views in the description to describe corresponding parts of embodiments of the invention.

FIG. 2 is a diagram showing an example of a physical disk configured with two simple virtual disks;

FIG. 3 is a diagram showing an example of a single concatenated virtual disk;

FIG. 4 is a diagram showing an example of an EMPATH virtual disk;

DETAILED DESCRIPTION OF THE PREFERRED EMBODIMENT

1. Architecture

Figure 1:
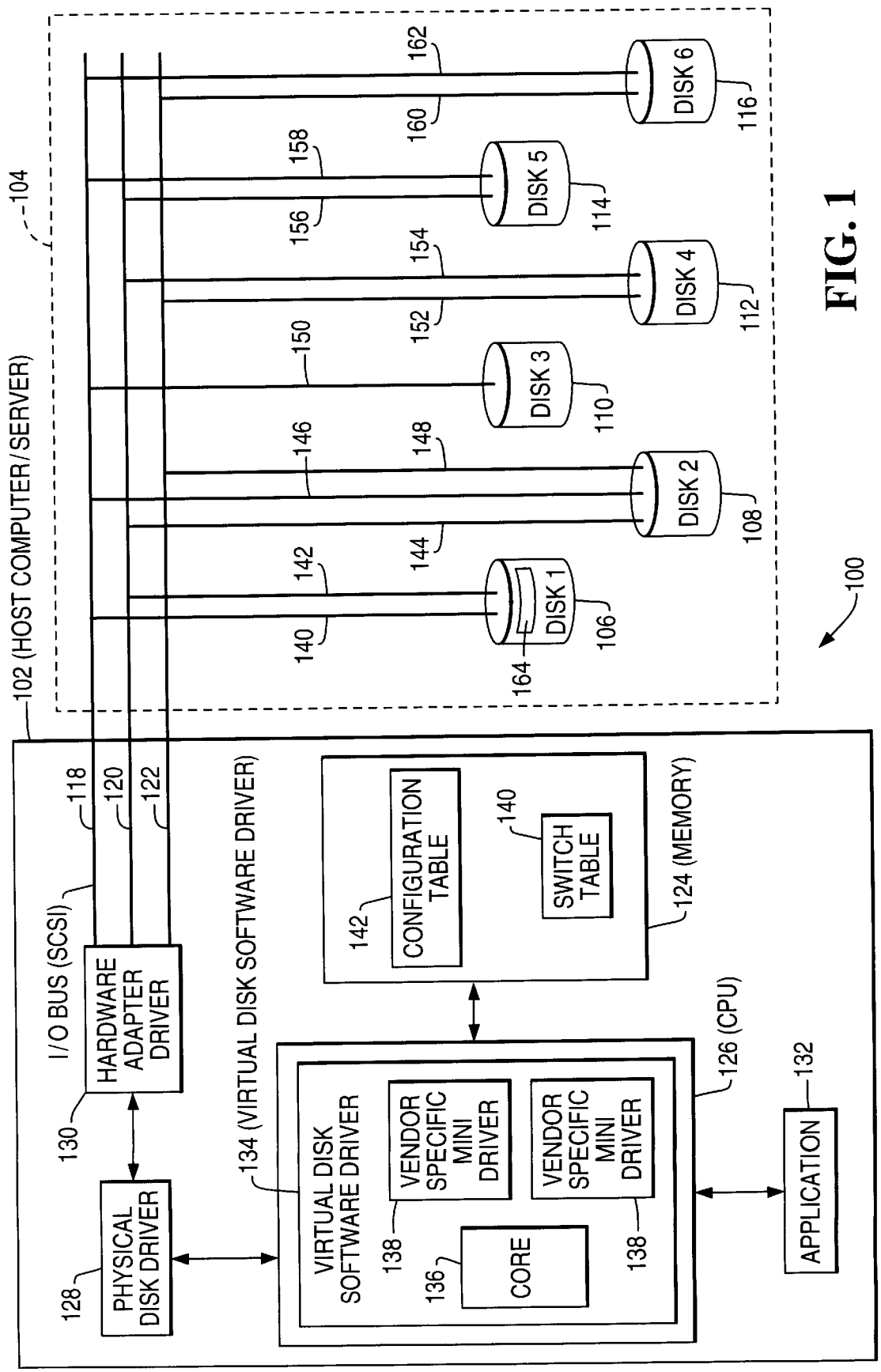
FIG. 1 is a block diagram showing the relationship between hardware and software elements in one embodiment of the present invention.

FIG. 1 is a block diagram showing an overview of one embodiment of an enhanced multi-pathing storage device EMPATH 100, comprising a host computer or server 102 coupled to an array of storage devices 104. Storage device array 104 comprises a plurality of storage devices (typically hard disk drives) 106, 108, 110, 112, 114 and 116. These storage devices 106–116 are operatively coupled to the computer 102 via one or more input/output (I/O) paths, formed by one or more I/O bus paths 118, 120, 122 compliant with a SCSI (small computer system interface) or other protocol from the computer 102 to the disk array 104, and one or more I/O device paths 140–162 from the I/O bus paths 118, 120, 122 to the storage devices 106–116.

The foregoing arrangement results in one or more I/O data paths from the computer 102 to storage devices 106–116. For example, in the illustration presented in FIG. 1, storage device 106 has two I/O paths, formed by I/O bus path 118 and I/O device path 140 and I/O bus path 120 and I/O device path 142. Either of these paths can be used to communicate data between the computer 102 and storage device 106. Similarly, storage device 108 has three data paths, formed by I/O bus path 118, 120 and 122 with I/O device paths 146, 144, and 148, respectively. Some data storage devices, such as device 110, may have a single I/O path.

Storage device array 104 defines one or more virtual disks 164, whose storage is defined by logical, rather than physical parameters. As such, the virtual disks 164 may be implemented by more than one physical disk 106–116, and a physical disk 106–116 may implement more than one virtual disk 164. Virtual disk 164 may be of several types, including simple, concatenated, striped (RAID 0), mirrored (RAID 1), array (RAID 3, RAID 4, or RAID 5), and interleaved. Disk arrays, a subset of virtual disk types, include RAID 0, RAID 1, soft RAID 3, RAID 4, and RAID 5.

FIG. 2 shows an example of a physical disk configured with two simple virtual disks 202, 204. Pieces 202, 204 are a group of physically contiguous blocks configured to a specific virtual disk (a physical disk "slice").

FIG. 3 shows an example of a single concatenated virtual disk made up of three pieces 302, 304, 306, spread over two physical disk drives, Disk 1 106 and Disk 2 108. A concatenated disk is formed from the logical concatenation of two or more disk pieces. This type of disk allows creation of a logical disk that may be larger than any single physical disk in the system. A concatenated disk may be made up of physical disk slices, previously defined simple disks, or a mixture of both. The size of the concatenated disk is the sum of the sizes of all its component parts.

FIG. 4 shows an example of an EMPATH virtual disk 402 in the storage device array 104. Each EMPATH virtual disk 402 comprises a plurality of pieces, with each piece providing an alternate I/O path to the same physical storage. Each entry for an EMPATH virtual disk piece has the same starting offset, length and slice, allowing the EMPATH virtual disk pieces to access the same physical slice on the disk.

Computer 102 comprises a memory 124 which can be used to store instructions for performing an application 132 running on the computer 102. The computer 102 also comprises a central processing unit, or CPU 126, which responds to instructions stored in the memory 124 to perform run the application 132. CPU 120 is operatively coupled to the storage device array 104 via a physical disk driver 128 and a hardware adapter driver 130. The hardware adapter driver 130 communicates with the devices in the storage device array 104 via I/O bus paths 118, 120 and 122. Hardware adapter driver 130 is capable of receiving messages from the storage device array 104 indicating the status of I/O messages sent to devices in the array 104 and the status of the storage devices 106–116 themselves. Physical disk driver 128 translates I/O requests from the computer 126 for the hardware adapter driver 130.

2. Virtual Disk Driver

Computer 102 also implements a virtual disk driver 126, which translates application 132 I/O requests into I/O virtual disk requests, and also configures the storage device array 104 to implement one or more EMPATH virtual disks 104. The virtual disk driver 126 assigns each of the I/O paths a state of either active (path is available for use in sending I/Os) or passive (an I/O path in the standby mode). At least one of the I/O paths is assigned an active status when the disk is configured.

The following is a sample EMPATH disk 402 definition for the configuration shown in FIG. 4:

/dev/dsk/vdisk14 empath 4
/dev/dsk/c10t6d0s4 0 9998 active
/dev/dsk/c20t6d0s4 0 9998 passive
/dev/dsk/c30t6d0s4 0 9998 active
/dev/dsk/c40t6d0s4 0 9998 passive This definition indicates that slice 4 on logical unit number 0 on target 6 is accessible from four I/O paths (busses), 410 (designated c10), 408 (designated c20), 406 (designated c30) and 404 (designated c40). Two of the paths are configured as 'active' paths, c10 and c30. The remaining two paths (c20, c40) are passive. This means that when an I/O is sent to vdisk14 402 it can be routed through either bus c10 or c30.

The virtual disk driver 134 can configure EMPATH virtual disk pieces in many ways. Multiple I/O paths to physical storage can be made by daisy-chaining SCSI cables in a shared-bus configuration, making the devices in the array visible to multiple busses. Alternatively, storage device arrays 104 which allow device visibility from multiple controllers and busses (such as disk arrays from the EMC™ Corporation) can be used. This allows for direct connection to the array but shared access to any particular device within the array.

To allow the virtual disk driver 134 to operate with a wide range of storage device array 104 hardware and software implementations, the virtual disk driver 126 comprises a core virtual disk driver 136 and one or more subordinate disk drivers 138. The core virtual disk driver comprises instructions which translate application 132 I/O requests into I/O virtual disk requests. Subordinate disk drivers 138 comprise a series of instructions which implement functionality appropriate for each particular disk array 104 configuration, protocol, and/or hardware implementation. For example, when a storage device array-specific function is required to perform controller switchovers or I/O load balancing, the appropriate subordinate disk driver 138 provides that functionality. In this way, the virtual disk driver 134 provides a generic, hardware-independent solution that supports storage device arrays with open systems. This allows, for example, that the storage device array 104 may be replaced or substituted with one from a different manufacturer, without altering the core virtual disk driver 136.

The virtual disk driver 134 also implements one or more I/O distribution algorithms that route I/O requests via an optimized I/O path. The virtual disk driver 134 also manages the routing of I/O requests around failed I/O paths. For example, when an active I/O path fails or goes out of service (due to an I/O error or failed SCSI cable for example) the virtual disk driver 134 marks the failed path out of service. If another active path is available, the virtual disk driver retries the I/O down the available alternate path. If another active path is not available, the virtual disk driver 134 designates a passive I/O path as active, and retries the I/O down the activated path. Because the virtual disk driver 134 serves as the interface between the application 132 and the storage device array 104, this process is transparent to the application 132, and the application 132 will only see the error if all possible I/O paths have been tried and all have failed.

3. Virtual Disk Driver Functions

In order to add support for different vendor types with the same core EMPATH driver software, a vendor specific switch table 140 and function macros are used to perform vendor specific functions. This section describes the switch table 140 and the vendor functions needed to support the empath core.

A list of the storage device array-specific functions implemented in the subordinate disk driver 138 which support the core virtual disk driver 136 is presented as follows:

Put Active Path Out of Service: This function takes I/O paths previously designated as active, and marks them out of service.

Put Passive Path Active: This function takes I/O paths previously designated as passive, and activates them.

Put Out Of service Path in Service: If an I/O path has been removed from service because of a failure, this function puts the path back in service by changing the path back to active after successful diagnostics are performed on the path. This function is typically used after the problem causing the I/O path failure has been resolved and remedied.

Determine Serial Number: This function allows the virtual disk driver 134 to determine if an I/O path for a virtual disk 164 is actually redundant with the other paths to the virtual disk 164. This function issues a vendor specific command to the storage device 106 to determine the storage device's 'serial number.'

I/O Distribution Policy: This function specifies the I/O distribution algorithm used to select I/O paths.

Identify Vendor Type: At virtual disk configuration time, this function determines what vendor type the redundant I/O paths are connected to, in order to determine which vendor to link up with in the vendor specific switch table 140. This action issues an inquiry command to the disk array 104, scans the switch table 124 looking for a match of the vendor ID in the inquiry data, and return an index into the switch table 140 if a vendor match is found.

4. Vendor Specific Switch Table

Switch table 140 supports different redundant path vendor types. Support for new vendor types are added by supplying subordinate disk drivers 138 in the host computer 102 kernel, and declaring these drivers as modules. When the virtual disk software driver 134 is initialized, a routine will determine how many vendor types are configured in the kernel.

5. Operation

Figure 5:
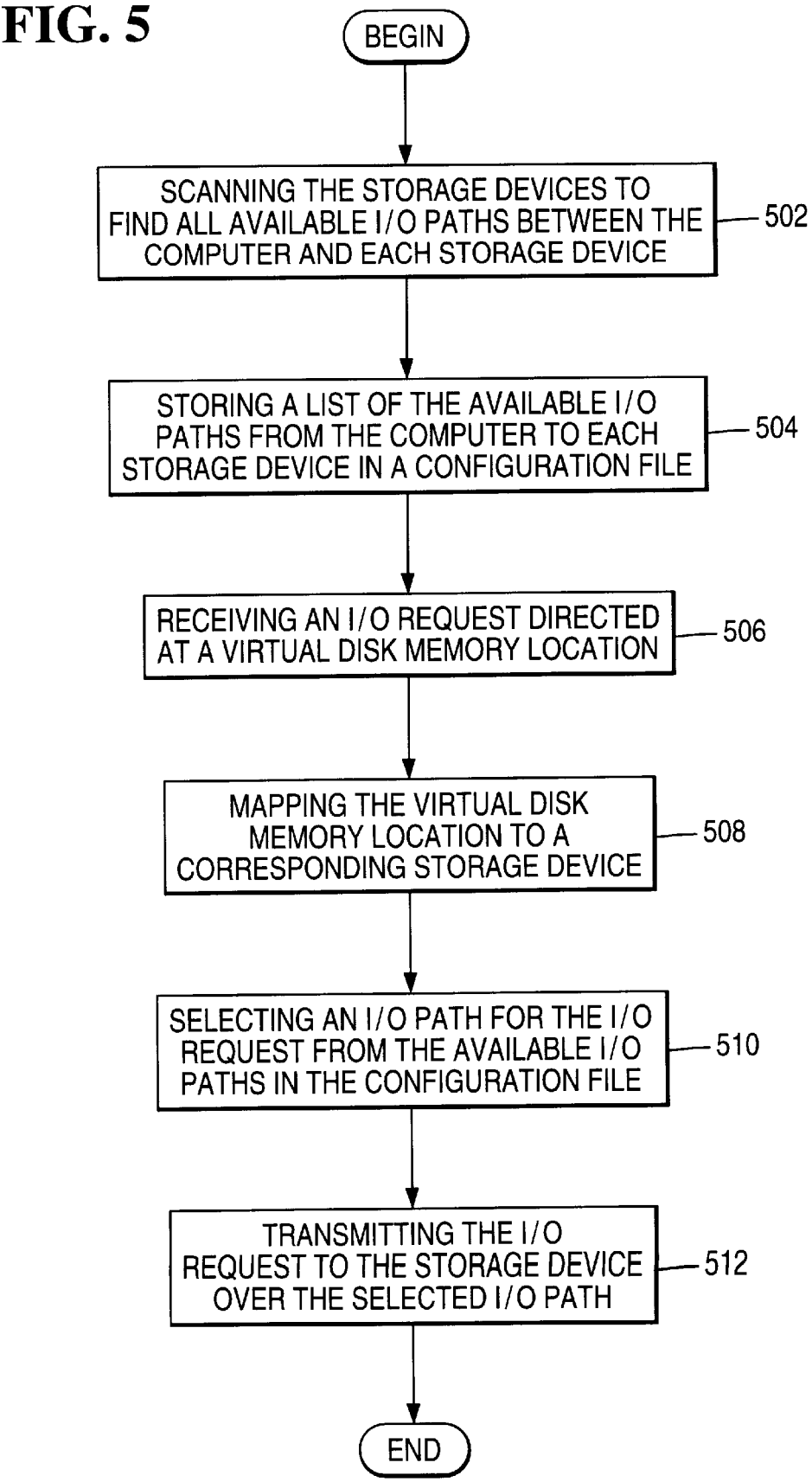
FIG. 5 is a flow chart showing an overview of the method steps employed in practicing one embodiment of the present invention.

FIG. 5 presents a flow chart illustrating the steps performed in practicing one embodiment of the present invention. First, the storage devices 106–116 are scanned to find all available I/O paths between the computer and each storage device. This is illustrated in block 502. Next, a list of the available I/O paths is stored 504 in a memory as a configuration file or table 142. An I/O request directed at a virtual disk memory location is received 506 in the virtual disk driver 138. The virtual disk memory location is mapped 508 to a corresponding storage device. Then, an I/O path for the I/O request is selected 510 from the available I/O paths in the configuration file 142. Finally, the I/O request is transmitted to the selected storage device over the selected I/O path. This is illustrated in block 512.

Figure 6:
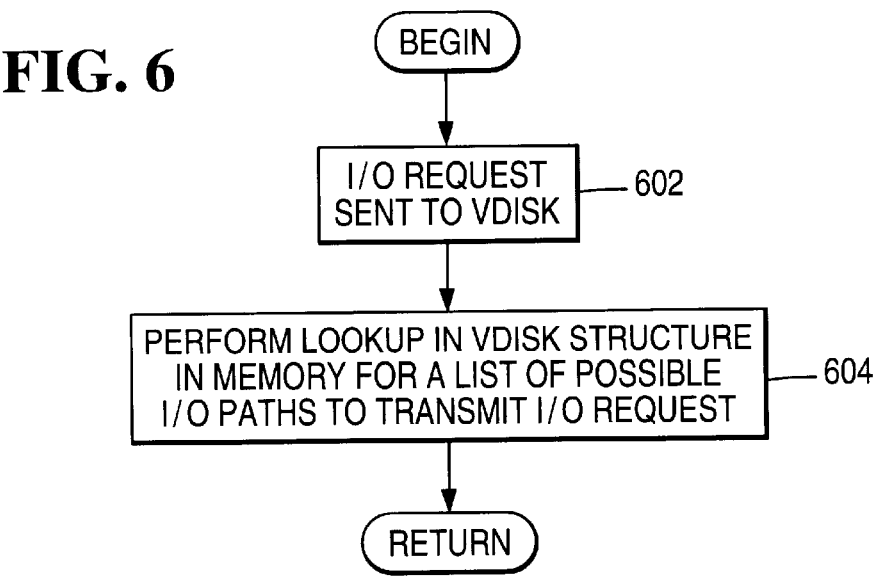
FIG. 6 is a flow chart showing the steps performed in mapping virtual disk memory to corresponding storage device memory in one embodiment of the present invention.

FIG. 6 presents a flow chart illustrating how the virtual disk memory is mapped to corresponding storage device. The virtual disk 402 structure is stored in memory 124. The virtual disk structure comprises is a path table having all available I/O paths. When an I/O request is sent to the virtual disk 402, a lookup process is completed using the path table to obtain a suitable physical storage device to transmit the I/O request.

Figure 7:
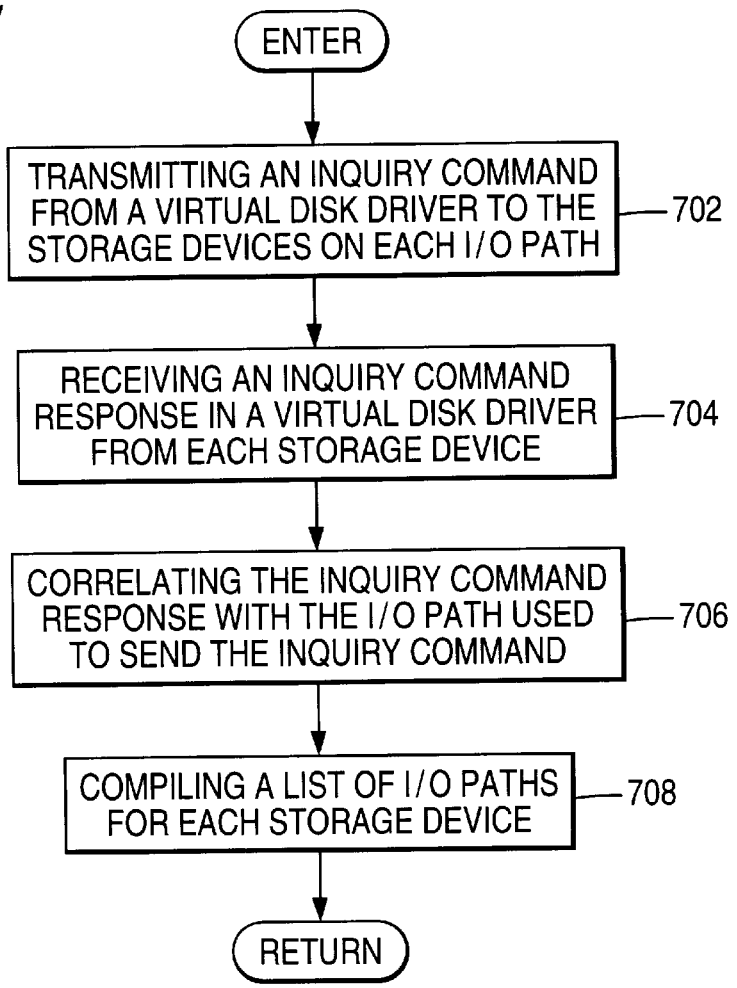
FIG. 7 is a flow chart showing the steps performed in scanning storage devices to find available I/O paths in one embodiment of the present invention.

FIG. 7 is a flow chart illustrating how the storage devices are scanned to identify available I/O paths in one embodiment of the invention. First, an inquiry command is transmitted 702 from the virtual disk driver 134 to each storage device 106–116 on each I/O path. Then, a response from each storage device 106–116 is received in the virtual disk driver 134. This response includes a unique identification number for each device 106–116. This is depicted in block 704. Next, the inquiry command response is correlated 706 with the I/O path used to send the inquiry command. For example, if an inquiry command is sent on every I/O path to a single device and three responses are received for that device, three redundant paths to that device exist, and can be determined by the paths by which the inquiry command was transmitted to the device. Finally, as indicated in block 708, a list of I/O paths is compiled for each storage device 106–116. Alternatively, the inquiry command can be used to query each virtual disk 164 defined in the array 104 in the same manner.

Figure 8:
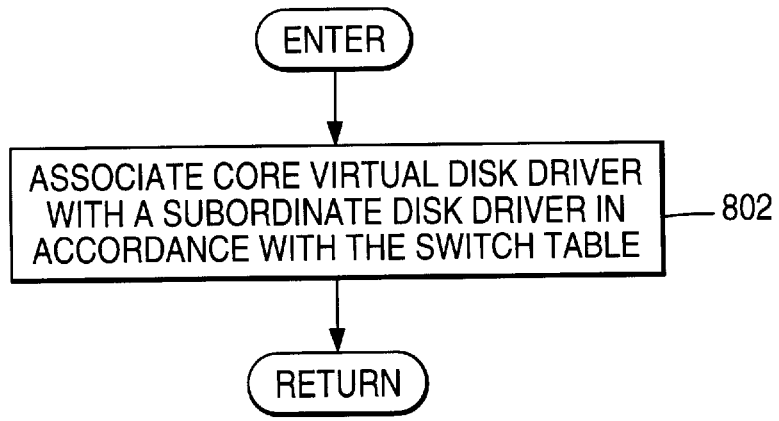
FIG. 8 is a flow chart showing the method steps performed in another embodiment of the present invention incorporating a switch table.

FIG. 8 is a flow chart illustrating the use of a switch table 140 in the computer 102 memory 124 to implement the present invention. In this embodiment, the core virtual disk driver 136 is associated with a subordinate disk driver 138 in accordance with the switch table 140, as described below.

Figure 9:
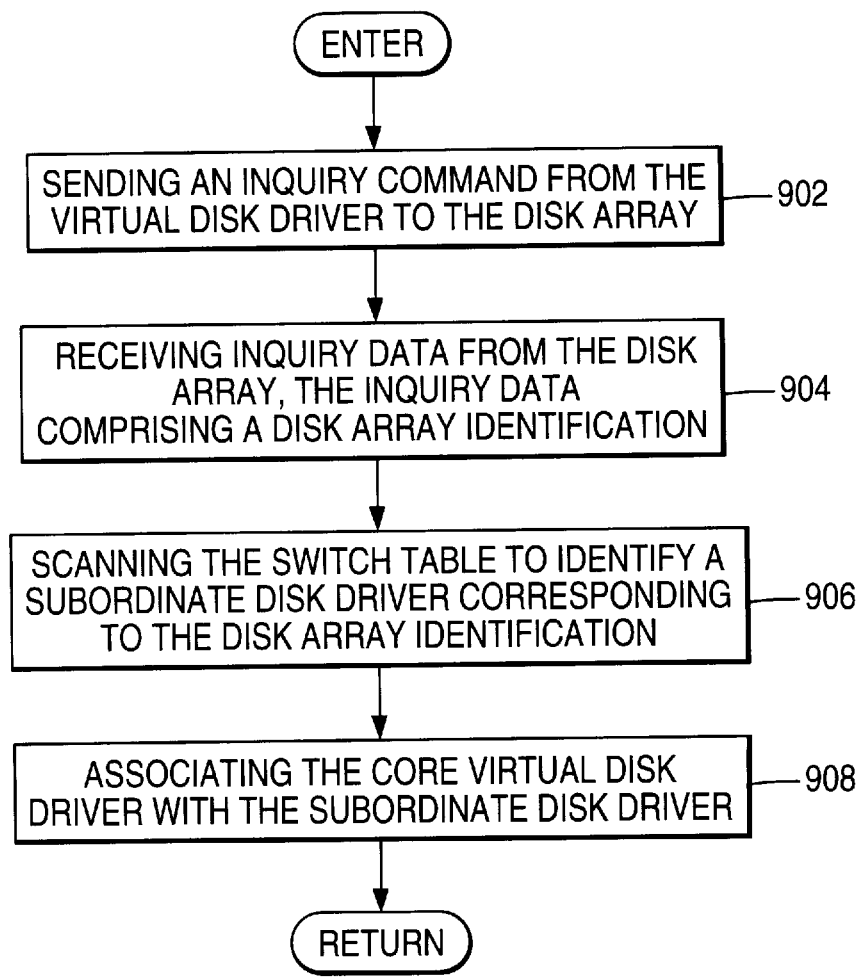
FIG. 9 is a flow chart further detailing the steps performed in one embodiment of the present invention incorporating a switch table.

FIG. 9 is a flow chart further detailing the steps performed in the foregoing embodiment of the present invention. First, an inquiry command is sent from the virtual disk driver 134 to the storage array devices 104. This is illustrated in block 902. Next, inquiry data is received 904 from the storage array devices 104. Then, the switch table 140 is scanned 906 to identify a subordinate disk driver 138 corresponding to the storage array device identification. Finally, the core virtual disk driver 136 is associated 908 with the subordinate disk driver 138.

Disk arrays can provide ample connectivity, both in terms of SCSI ports available for connecting with the computer(s) 102 and can map logical volumes of storage to multiple front end controllers, but prior art solutions route all application 132 I/Os over only a few of the SCSI busses interconnecting the computer(s) 102 and the storage device array 104. The present invention, however, uses a distribution policy to dynamically choose a path to send an I/O request among the available paths based on the workload and the I/O profile that currently exists on the system. This is accomplished with system level configuration analysis, using different scoring techniques to select the I/O path(s) to use for each storage volume.

Figure 10:
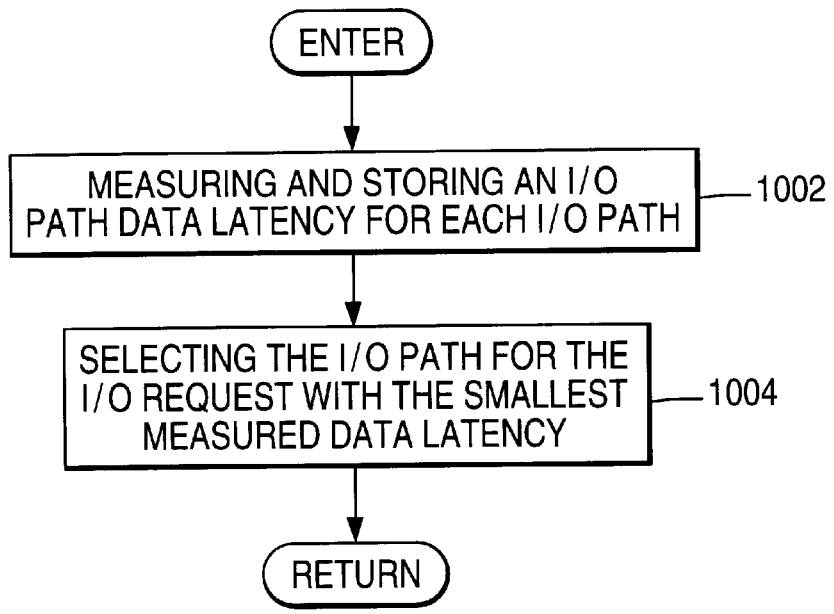
FIG. 10 is a flow chart showing the steps performed in selecting an I/O path for the I/O request in one embodiment of the present invention.

FIG. 10 is a flow chart showing the steps performed in selecting the I/O path for the I/O request in one embodiment of the present invention. First, as shown in block 1002, the I/O data path latency is measured and stored for each I/O path. Next, the I/O path with the smallest measured data latency is selected 1004 for use.

Figure 11:
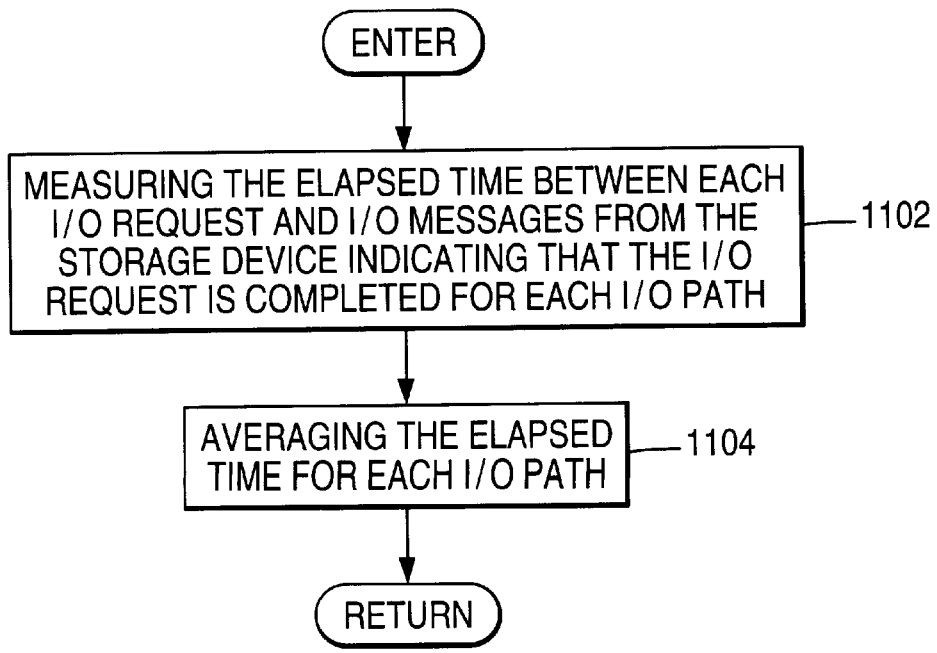
FIG. 11 is a flow chart further detailing the steps performed in selecting an I/O path for the I/O request in one embodiment of the present invention.

FIG. 11 presents a flow chart further detailing the process described above. First, the measured time is determined by measuring 1102 the time between each I/O request and I/O messages from the device indicating that the I/O request was completed. This process is completed for each I/O path under examination, and the results are averaged 1104 to determine the latency for each I/O path.

Figure 12:
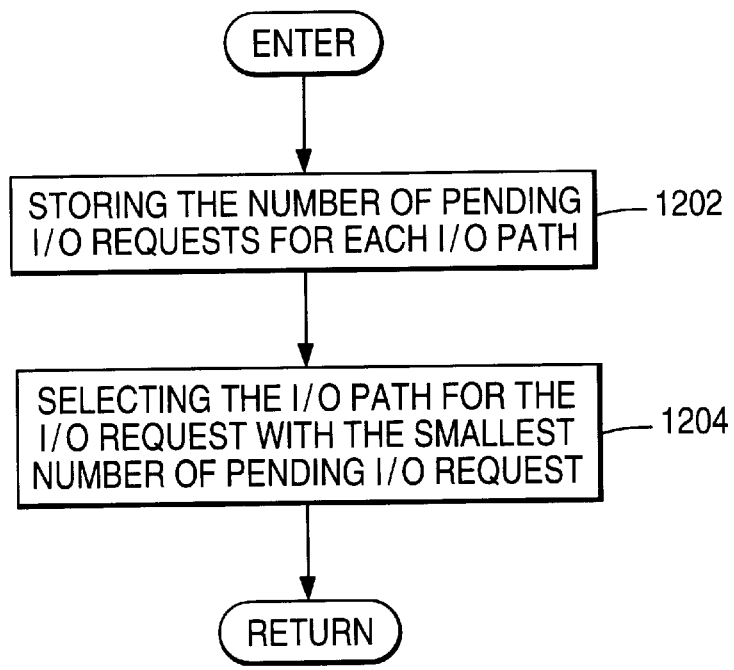
FIG. 12 is a flow chart showing the steps performed in selecting an I/O path for the I/O request in an alternate embodiment of the present invention.

FIG. 12 is a flow chart showing the steps performed in selecting an I/O path for the I/O request in an alternate embodiment of the invention in which pending requests are used as a discriminant. This may be accomplished by setting a counter for each I/O path whenever a request is transmitted over the I/O path, and decrementing the counter whenever that request is completed, or, as shown in block 1202, storing the number of pending I/O requests for each I/O path. This information is used to select the I/O path with the smallest "queue." Alternative embodiments are also possible in which other parameters describing the I/O request or the I/O data path can be used to optimize transmission of data. These parameters include, for example, the size (number of logical blocks, bits, or bytes) of each pending I/O request, whether the I/O request is directed at largely contiguous data, and whether the I/O request is a read or a write request. The present invention can be used to complete either static (only one I/O path is active) or dynamic load balancing (more than one I/O path is active).

In many cases, multiple storage volumes are accessed over a particular I/O path. In prior art devices, I/O stream (a concatenation of I/O requests for a particular device) errors for each device are encountered and detected independently. Hence, each stream suffers the delays associated with error detection. Further, when an I/O path exhibits an intermittent failure, the errors may show up sporadically on a per device basis and never reach the point of invoking a path switchover. The present invention eliminates these problems by including an error detection interface which enables the hardware adapter 130 to score the severity of errors and tally those scores on a per SCSI bus basis. For example, parity errors are typically severe enough to warrant marking the I/O path as out of service, even if only one error is received. I/O timeouts, on the other hand are less severe, and are treated differently. The tally is reset whenever a request successfully completes. When a tally reaches a threshold value, the adapter driver 130 can immediately notify the virtual disk driver 134 to switch over all I/O paths and devices using the failing SCSI bus. This technique can improve switchover time by an order of magnitude or more, because without this feature, application response time may appear to hang for several minutes. Conversely, with the present invention, switchover times are in the order of seconds.

Figure 13:
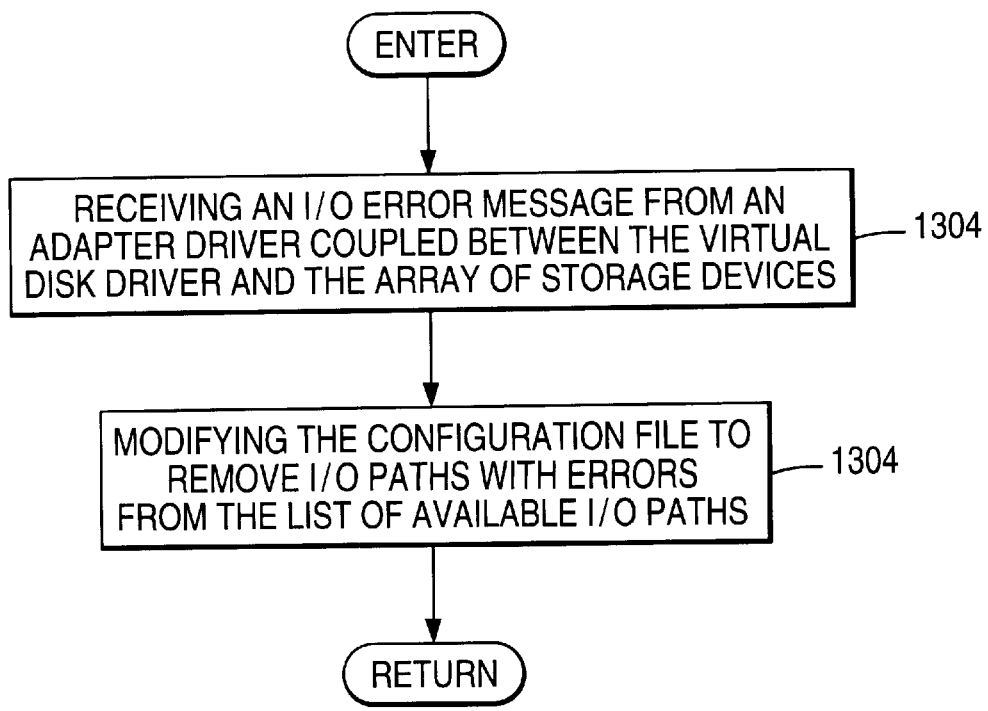
FIG. 13 is a flow chart showing the steps performed in selecting an I/O path for the I/O request in response to defective or intermittent I/O paths.

FIG. 13 is a flow chart showing the steps performed in selecting an I/O path for the I/O request in response to a defective or intermittent I/O path. When an I/O request generates an error message from the hardware adapter driver 130 or similar device, the virtual disk driver 134 removes that I/O path from the configuration file's list of available I/O paths.

CONCLUSION

This concludes the description of the preferred embodiment of the invention. In summary, the present invention provides for hardware independent, system level control and management of the storage and retrieval of data from an array of storage devices. The method comprises the steps of scanning an array of storage devices operatively coupled to a computer to find all available I/O paths between the computer and each storage device, storing a list of available I/O paths from the computer to each storage device in the configuration file, receiving an I/O request directed at a virtual disk memory location, mapping the virtual disk memory location to a corresponding storage device, selecting an I/O path for the I/O request from the available I/O paths in the configuration file, and transmitting the I/O request to the storage device over the selected I/O path. The apparatus comprises a virtual disk driver, comprising a scanner for finding available I/O paths between the computer and each storage device and for storing a list of available I/O paths in a configuration file in a memory, a receiver for accepting I/O requests directed at a virtual disk memory location, a module for mapping the virtual disk memory location to a corresponding storage device and for selecting an I/O path for the I/O request, and a transmitter for sending the I/O request to the storage device over the selected I/O path.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of storing and retrieving information from an array of storage devices implementing a plurality of virtual disk drives, the storage devices operatively coupled to a computer by a plurality of (I/O) paths, comprising the steps of:

scanning the storage devices to find available I/O paths between the computer and each storage device;

storing a list of the available I/O paths between the computer and each storage device in a configuration file;

receiving an I/O request directed at a virtual disk memory location in a virtual disk driver, the virtual disk driver comprising a core virtual disk driver and a subordinate driver implementing storage array specific functions;

associating the core virtual disk driver with the subordinate disk driver in accordance with a switch table stored in a memory of the computer;

mapping the virtual disk memory location to a corresponding storage device;

selecting an I/O path for the I/O request from the list of available I/O paths in the configuration file; and transmitting the I/O request to the storage device over the selected I/O path.

2. The method of claim 1, wherein the step of scanning the storage devices to find all available I/O paths between the computer and each storage device comprises the step of:

transmitting an inquiry command from a virtual disk driver to the storage devices on each I/O path;

receiving an inquiry command response in the virtual disk driver from each storage device, the inquiry command response comprising an identification unique to the storage device;

correlating the inquiry command response with the I/O path used to send the inquiry command; and compiling a list of I/O paths for each storage device.

3. The method of claim 1, wherein the step of associating the core virtual disk driver with the subordinate disk driver in accordance with the switch table comprises the steps of:

sending an inquiry command from the virtual disk driver to the storage device array;

receiving inquiry data from the disk array, the inquiry data comprising a storage device array identification;

scanning the switch table to identify a subordinate disk driver corresponding to the storage array identification; and associating the core virtual disk driver with the subordinate disk driver.

4. The method of claim 1, wherein the I/O paths comprise active I/O paths designated for completing I/O requests, and passive I/O paths designated to complete I/O requests only upon an active I/O path failure, and the storage array specific functions comprise:

a function for marking an active I/O path as unavailable;

a function for marking a passive I/O path as active;

a function for marking an unavailable I/O path as available;

a function for determining a unique identification for each storage device;

a function for selecting an algorithm to select an I/O path for the I/O request from the available I/O paths in the configuration file; and a function for determining a unique identification of the storage device array.

5. The method of claim 1, wherein the step of selecting an I/O path comprises the step of selecting successive I/O paths.

6. The method of claim 1, wherein the step of selecting an I/O path comprises the steps of:

measuring an I/O path data latency for each I/O path; and selecting the I/O path for the I/O request according to the measured data latency.

7. The method of claim 6, further comprising the step of receiving an I/O message from the storage device indicating that the I/O request is completed and wherein the step of measuring and storing an I/O path data latency for each I/O path comprises the steps of:

measuring the elapsed time between each I/O request and I/O messages from the storage device indicating that the I/O request is completed for each I/O path; and averaging the elapsed time for each I/O path.

8. The method of claim 1, wherein a pending I/O request is defined by an I/O request for which a message indicating the I/O request is completed has not been received, and wherein the step of selecting an I/O path comprises the steps of:

determining the number of pending I/O requests for each I/O path; and selecting the I/O path for the I/O request according to the number of pending I/O requests.

9. The method of claim 1, wherein a pending I/O request is defined by an I/O request for which a message indicating the I/O request is completed has not been received, and wherein the I/O path is selected according to whether the pending I/O requests are read requests or write requests.

10. The method of claim 1, wherein a pending I/O request is defined by an I/O request for which a message indicating the I/O request is completed has not been received, and wherein the pending I/O request designates data in the storage devices of a size, and wherein the I/O path is selected according to the size of the data designated by the pending I/O requests on each I/O path.

11. The method of claim 1, further comprising the steps of:

receiving an I/O error message from an adapter driver coupled between the virtual disk driver and the array of storage devices, the I/O error message indicating the I/O paths with errors and an I/O path error type; and modifying the configuration file to remove I/O paths with errors from the list of available I/O paths.

12. The method of claim 11, wherein the I/O error message indicates an I/O error type, and the configuration file is modified to remove I/O paths with errors from the list of available I/O paths in accordance with the I/O error type.

13. An apparatus for storing and retrieving information from an array of storage devices implementing a plurality of virtual disk drives, the storage devices operatively coupled to a computer by a plurality of I/O paths, the apparatus comprising a virtual disk driver, executing on the computer, comprising:

a scanner for finding available I/O paths between the computer and each storage device and for storing a list of the available I/O paths in a configuration file in a memory coupled to the computer;

a receiver, for accepting I/O requests directed at a virtual disk memory location from an application executing on the computer;

a module for mapping the virtual disk memory location to a corresponding storage device and for selecting an I/O path for the I/O request from the list of available I/O paths in the configuration file;

a transmitter for sending the I/O request to the storage device over the selected I/O path; and wherein the virtual disk driver comprises a core virtual disk driver and a subordinate driver implementing storage array-specific functions, and the vitual disk driver further comprises a means for associating the core virtual disk driver with the subordinate disk driver in accordance with a switch table stored in the memory of the computer.

14. The apparatus of claim 13, wherein the scanner comprises:

means for transmitting an inquiry command from the virtal disk driver to the storage devices on each I/O path;

means for receiving an inquiry command response in the virtal disk driver from each storage device;

means for correlating the inquiry command response with the I/O path used to send the inquiry command; and means for compiling a list of I/O paths for each storage device.

15. The apparatus of claim 13, wherein the associating means comprises:

means for sending an inquiry command from the virtual disk driver to the storage device array;

means for receiving inquiry data from the disk array, the inquiry data comprising a storage device array identification;

means for scanning the switch table to identify a subordinate disk driver corresponding to the storage array identification;

means for associating the core virtual disk driver with the subordinate disk driver.

16. The apparatus of claim 13, wherein the module comprises means for successively selecting I/O paths.

17. The apparatus of claim 13, wherein the module further comprises a means for measuring an I/O path data latency for each I/O path and selecting the I/O path for the I/O request according to the measured data latency.

18. The apparatus of claim 13, wherein a pending I/O request is defined by an I/O request for which a message indicating the I/O request is completed has not been received, and wherein the module comprises a means for determining the number of pending I/O requests for each I/O path and for selecting the I/O path for the I/O request according to the number of pending I/O requests.

19. The apparatus of claim 13, wherein a pending I/O request is defined by an I/O request for which a message indicating the I/O request is completed has not been received, and wherein the pending I/O request designates data in the storage devices of a size, and wherein the module comprises a means for selecting the I/O path for the I/O request according to the size of the data designated by the pending I/O requests on each I/O path.

20. The apparatus of claim 13, further comprising:
   means for receiving an I/O error message from an adapter driver coupled between the virtual disk driver and the array of storage devices, the I/O error message indicating the I/O paths with errors and an I/O path type; and
   means for modifying the configuration file to remove I/O paths with errors from the list of available I/O paths.

21. The apparatus of claim 20, wherein the I/O error message indicates an I/O error type, and the module further comprises a means for modifying the configuration file to remove I/O paths with errors in accordance with the I/O error type.

22. A program storage device, readable by a computer having a processor and a memory tangibly embodying one or more programs of instructions executable by the computer to perform method steps of storing and retrieving information from an array of storage devices implementing a plurality of virtual disk drives, the storage devices operatively coupled to the computer by a plurality of (I/O) paths, the method comprising the steps of:
   scanning the storage devices to find available I/O paths between the computer and each storage device;
   storing a list of the available I/O paths between the computer and each storage device in a configuration file;
   receiving an I/O request directed at a virtual disk memory location in a virtual disk driver; the virtual disk driver comprising a core virtual disk driver and a subordinate driver implementing storage array-specific functions;
   associating the core virtual disk driver with the subordinate disk driver in accordance with a switch table stored in a memory of the computer;
   mapping the virtual disk memory location to a corresponding storage device;
   selecting an I/O path for the I/O request from the list of available I/O paths in the configuration file; and
   transmitting the I/O request to the storage device over the selected I/O path.

23. The program storage device of claim 22, wherein the method step of scanning the storage devices to find all available I/O paths between the computer and each storage device comprises the method steps of:
   transmitting an inquiry command from a virtual disk driver to the storage devices on each I/O path;
   receiving an inquiry command response in the virtual disk driver from each storage device, the inquiry command response comprising an identification unique to the storage device;
   correlating the inquiry command response with the I/O path used to send the inquiry command; and
   compiling a list of I/O paths for each storage device.

24. The program storage device of claim 22, wherein the method step of associating the core virtual disk driver with the subordinate disk driver in accordance with the switch table comprises the method steps of:
   sending an inquiry command from the virtual disk driver to the storage device array;
   receiving inquiry data from the disk array, the inquiry data comprising a storage device array identification;
   scanning the switch table to identify a subordinate disk driver corresponding to the storage array identification; and
   associating the core virtual disk driver with the subordinate disk driver.

25. The program storage device of claim 22, wherein the method step of selecting an I/O path comprises the method step of selecting successive I/O paths.

26. The program storage device of claim 22, wherein the method step of selecting an I/O path comprises the method steps of:
   measuring an I/O path data latency for each I/O path; and
   selecting the I/O path for the I/O request according to the measured data latency.

27. The program storage device of claim 26, wherein the method steps further comprise the step of receiving an I/O message from the storage device indicating that the I/O request is completed and wherein the method step of measuring and storing an I/O path data latency for each I/O path comprises the steps of:
   measuring the elapsed time between each I/O request and I/O messages from the storage device indicating that the I/O request is completed for each I/O path; and
   averaging the elapsed time for each I/O path.

28. The program storage device of claim 26, wherein a pending I/O request is defined by an I/O request for which a message indicating the I/O request is completed has not been received, and wherein the method step of selecting an I/O path comprises the method steps of:
   determining the number of pending I/O requests for each I/O path; and
   selecting the I/O path for the I/O request according to the number of pending I/O requests.

29. The program storage device of claim 26 wherein the method steps further comprise the steps of:
   receiving an I/O error message from an adapter driver coupled between the virtual disk driver and the array of storage devices, the I/O error message indicating the I/O paths with errors and an I/O path error type; and
   modifying the configuration file to remove I/O paths with errors from the list of available I/O paths.

* * * * *